US012496702B2

(12) United States Patent
Page et al.

(10) Patent No.: US 12,496,702 B2
(45) Date of Patent: Dec. 16, 2025

(54) SLED SYSTEMS FOR CUTTING STORED MATERIALS AND FOR STORING ELONGATED AND FLEXIBLE SUPPLIES

(71) Applicant: Lucid Concepts, LLC, Macclesfield, NC (US)

(72) Inventors: Christopher Scott Page, Stantonsburg, NC (US); Gregory Bruce Hathaway, Macclesfield, NC (US)

(73) Assignee: Lucid Concepts, LLC, Macclesfield, NC (US)

( * ) Notice: Subject to any disclaimer, the term of this patent is extended or adjusted under 35 U.S.C. 154(b) by 159 days.

(21) Appl. No.: 17/994,132

(22) Filed: Nov. 25, 2022

(65) Prior Publication Data

US 2023/0173655 A1 Jun. 8, 2023

Related U.S. Application Data

(60) Provisional application No. 63/287,110, filed on Dec. 8, 2021.

(51) Int. Cl.

*B25H 3/02* (2006.01)
*B25H 3/00* (2006.01)

(52) U.S. Cl.

CPC ............. *B25H 3/022* (2013.01); *B25H 3/003* (2013.01)

(58) Field of Classification Search

CPC ............. B25H 3/02; B25H 3/00; B65D 75/70
See application file for complete search history.

(56) References Cited

U.S. PATENT DOCUMENTS

| | | | | | |
|---|---|---|---|---|---|
| 4,861,970 | A * | 8/1989 | Hwang | A45C 11/34 | 235/1 R |
| 5,083,669 | A | 1/1992 | Wisehart | | |
| 5,713,468 | A * | 2/1998 | Streichan | B25H 3/06 | 220/729 |
| RE36,143 | E * | 3/1999 | Kind | B26D 5/22 | 83/13 |
| 6,170,426 | B1 * | 1/2001 | Thorsbakken | A47K 10/32 | 15/104.93 |

(Continued)

FOREIGN PATENT DOCUMENTS

WO 2018-055576 A1 3/2018

OTHER PUBLICATIONS

PCT Search Report and Written Opinion dated Mar. 24, 2023 for PCT International Application No. PCT/US2022/051006.

(Continued)

*Primary Examiner* — Ernesto A Grano
*Assistant Examiner* — Symren K Sanghera
(74) *Attorney, Agent, or Firm* — Olive Law Group, PLLC

(57) ABSTRACT

Systems for cutting stored materials and for storing elongated and flexible supplies are disclosed. According to an aspect, a system includes a sled comprising a body that defines a plurality of compartments for holding objects. Example objects include, but are not limited to, tools, supplies, tape, electronic devices, zip ties, spools of supplies or materials, and keys. The body further defines a channel that extends between one of the compartments and an opening. The system also includes a cutting mechanism positioned adjacent the channel and configured to cut and/or tear a material stored within the one of the compartments.

17 Claims, 20 Drawing Sheets

(56) References Cited

U.S. PATENT DOCUMENTS

| | | | | |
|---|---|---|---|---|
| 6,520,444 | B1 * | 2/2003 | Muller | H02G 11/02 242/388.6 |
| 6,981,780 | B2 | 1/2006 | Einav | |
| 7,063,339 | B2 | 6/2006 | Jarko et al. | |
| 7,069,972 | B1 * | 7/2006 | Edelstein | B65H 35/0066 156/719 |
| 7,364,040 | B1 | 4/2008 | Hunter et al. | |
| 8,210,356 | B1 * | 7/2012 | Krull | A47B 21/00 206/214 |
| 8,322,262 | B2 * | 12/2012 | Ryu | A23P 20/20 242/348 |
| 8,336,708 | B2 | 12/2012 | Potterfield et al. | |
| 8,893,885 | B2 | 11/2014 | Hutchens | |
| 9,566,704 | B1 | 2/2017 | Stoikos et al. | |
| 10,500,714 | B2 * | 12/2019 | Hunter | B25H 3/06 |
| 2004/0069668 | A1 | 4/2004 | Finnigan | |
| 2006/0202079 | A1 * | 9/2006 | Pavlik | B65H 35/0086 242/562 |
| 2007/0034728 | A1 * | 2/2007 | Moores | B65H 39/16 242/588.1 |
| 2008/0083634 | A1 | 4/2008 | Parker | |
| 2008/0290211 | A1 * | 11/2008 | Briante | A47K 10/38 242/593 |
| 2011/0215129 | A1 * | 9/2011 | McGuigan | B26F 3/02 225/91 |
| 2012/0028219 | A1 * | 2/2012 | Emerton | A61C 19/063 433/180 |
| 2016/0263740 | A1 | 9/2016 | Sackfield | |
| 2017/0263084 | A1 | 9/2017 | Millius | |
| 2017/0296004 | A1 * | 10/2017 | Borke | A47K 10/3625 |
| 2017/0361454 | A1 | 12/2017 | Hsu | |
| 2020/0406446 | A1 | 12/2020 | Hoppe et al. | |
| 2021/0219532 | A1 | 7/2021 | Bessac et al. | |
| 2021/0228031 | A1 * | 7/2021 | Bernacchi | A47K 10/3836 |
| 2021/0252691 | A1 | 8/2021 | Bosworth | |
| 2022/0087767 | A1 * | 3/2022 | Chien | A61B 50/31 |
| 2022/0143806 | A1 * | 5/2022 | Herrera | A45F 5/021 |

OTHER PUBLICATIONS

Office Action dated Jun. 4, 2024 for Design U.S. Appl. No. 29/861,057.

Amendment in Response to Jun. 4, 2024 Office Action for Design U.S. Appl. No. 29/861,057.

Notice of Allowance dated Nov. 29, 2024 for Design U.S. Appl. No. 29/861,057.

Office Action dated Jun. 4, 2024 for Design U.S. Appl. No. 29/861,056.

Amendment in Response to Jun. 4, 2024 Office Action for Design U.S. Appl. No. 29/861,056.

Notice of Allowance dated Nov. 15, 2024 for Design U.S. Appl. No. 29/861,056.

* cited by examiner

SLED SYSTEMS FOR CUTTING STORED MATERIALS AND FOR STORING ELONGATED AND FLEXIBLE SUPPLIES

CROSS REFERENCE TO RELATED APPLICATIONS

This application claims priority to and the benefit of U.S. Provisional Patent Application No. 63/287,110, filed Dec. 8, 2021, and titled SLED SYSTEMS FOR CUTTING STORED MATERIALS AND FOR STORING ELONGATED AND FLEXIBLE SUPPLIES, the disclosure of which is incorporated by reference herein in its entirety.

The present application is related to U.S. Design Patent Application titled STORAGE AND TRANSPORT SLED, having application Ser. No. 29/861,056, filed simultaneously herewith, and U.S. Design Patent Application titled STORAGE AND TRANSPORT SLED WITH INSERT, having application Ser. No. 29/861,057, filed simultaneously herewith. The present application is also related to PCT International Patent Application titled SLED SYSTEMS FOR CUTTING STORED MATERIALS AND FOR STORING ELONGATED AND FLEXIBLE SUPPLIES, having application serial number PCT/US22/51006, and filed simultaneously herewith.

TECHNICAL FIELD

The presently disclosed subject matter relates generally to object storage and transport. Particularly, the presently disclosed subject matter relates to sled systems for cutting stored materials and for storing elongated and flexible supplies.

BACKGROUND

Maintenance, repair, and replacement of installed equipment is often needed in the skilled trades industry. For example, a water heater in a residence may need maintenance and repair. In many such cases, a technician or repair person may need to travel through and work within a small and confined area, such as a crawlspace, in order to reach and attend to the equipment.

Tools, materials, and supplies are generally needed to be carried to installed equipment. Various types of tools, materials, and supplies for maintenance and repair include drills, various tapes, ties, and electronic devices. Also, the technician may desired to carry personal items such as keys and a smartphone. The convenient transport of such objects to the equipment is needed, and often a toolbox is used for transport of these objects. In addition, while at the equipment, it is desired to be able to conveniently access and use the carried objects. For example, the workspace at the equipment may be very limited in size, so it is very helpful and convenient if a technician is able to easily manage and use the carried objects. Currently-available tool bags and tool trays do not perform well in a crawlspace environments and thus lead to lost tools, inadequate space for critical tools.

In view of the foregoing, there is a continuing need for improved systems and techniques for conveniently and efficiently transporting objects to a small workspace. In addition, there is a continuing need for systems and techniques for enabling the more convenient and efficient use of the transported objects at the workspace.

BRIEF DESCRIPTION OF THE DRAWINGS

Figure 1:
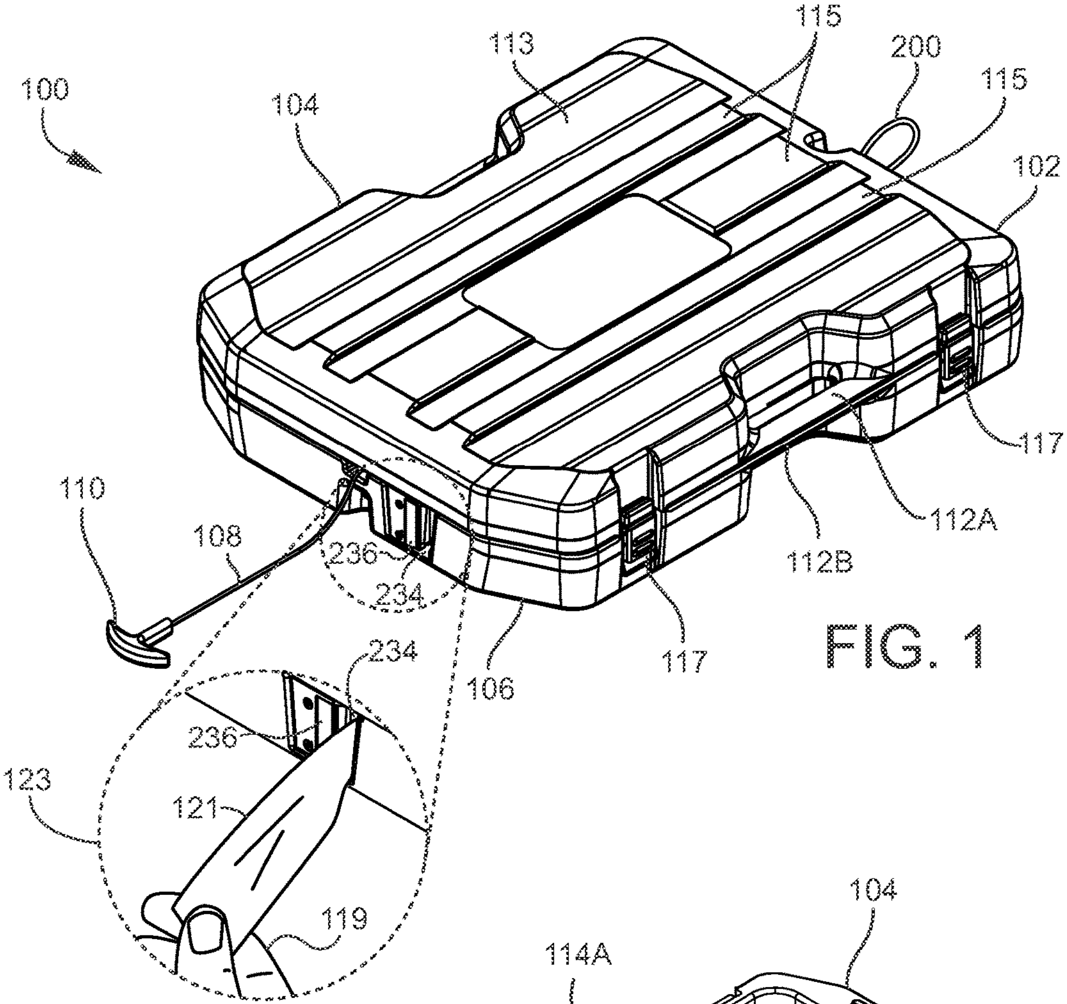
Figure 2:
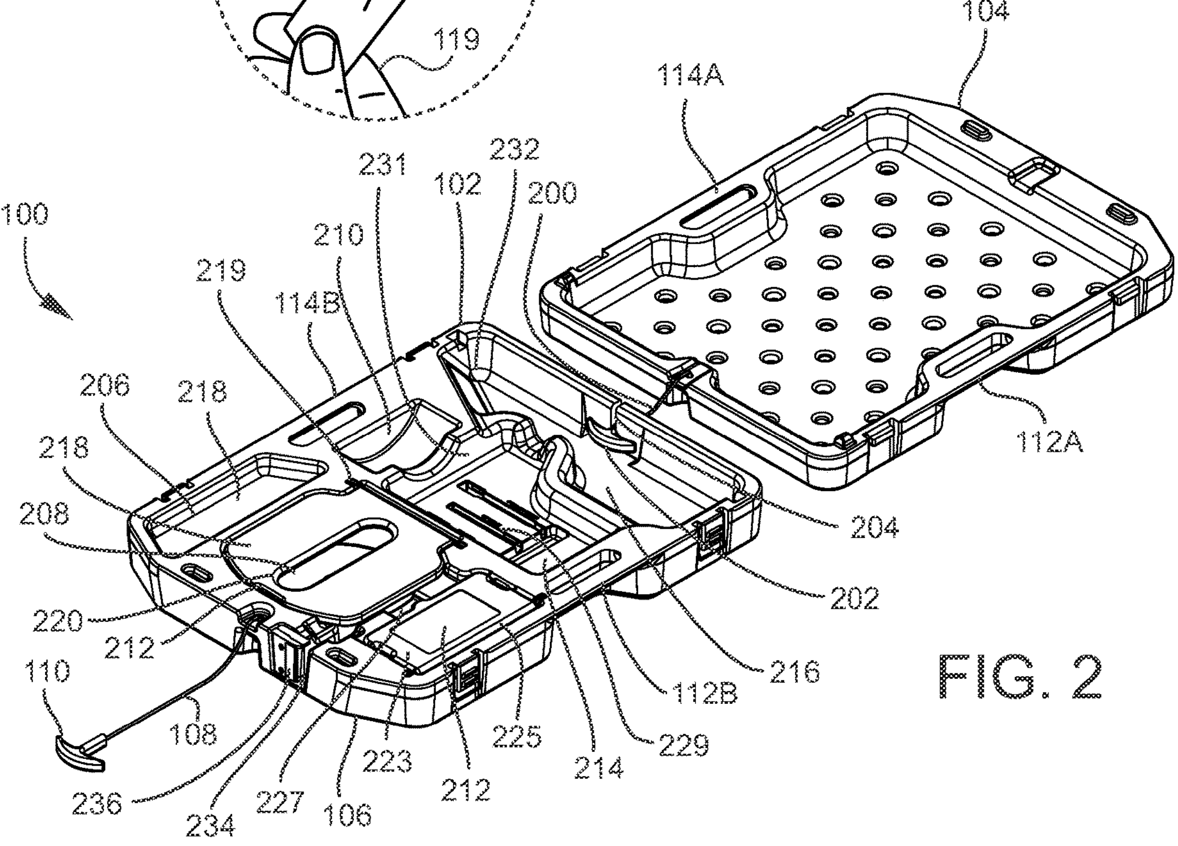
Figure 3:
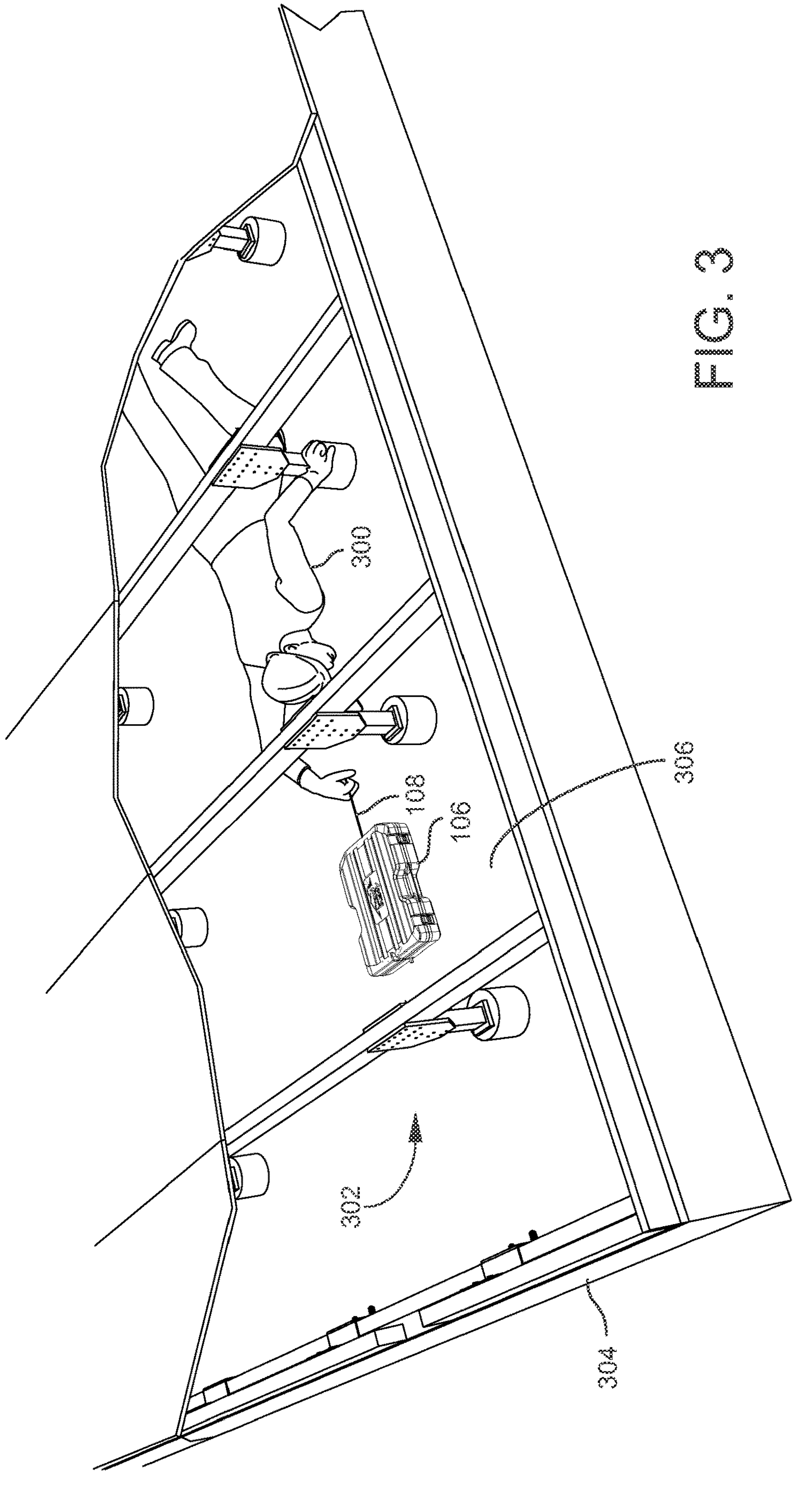
Figure 4:
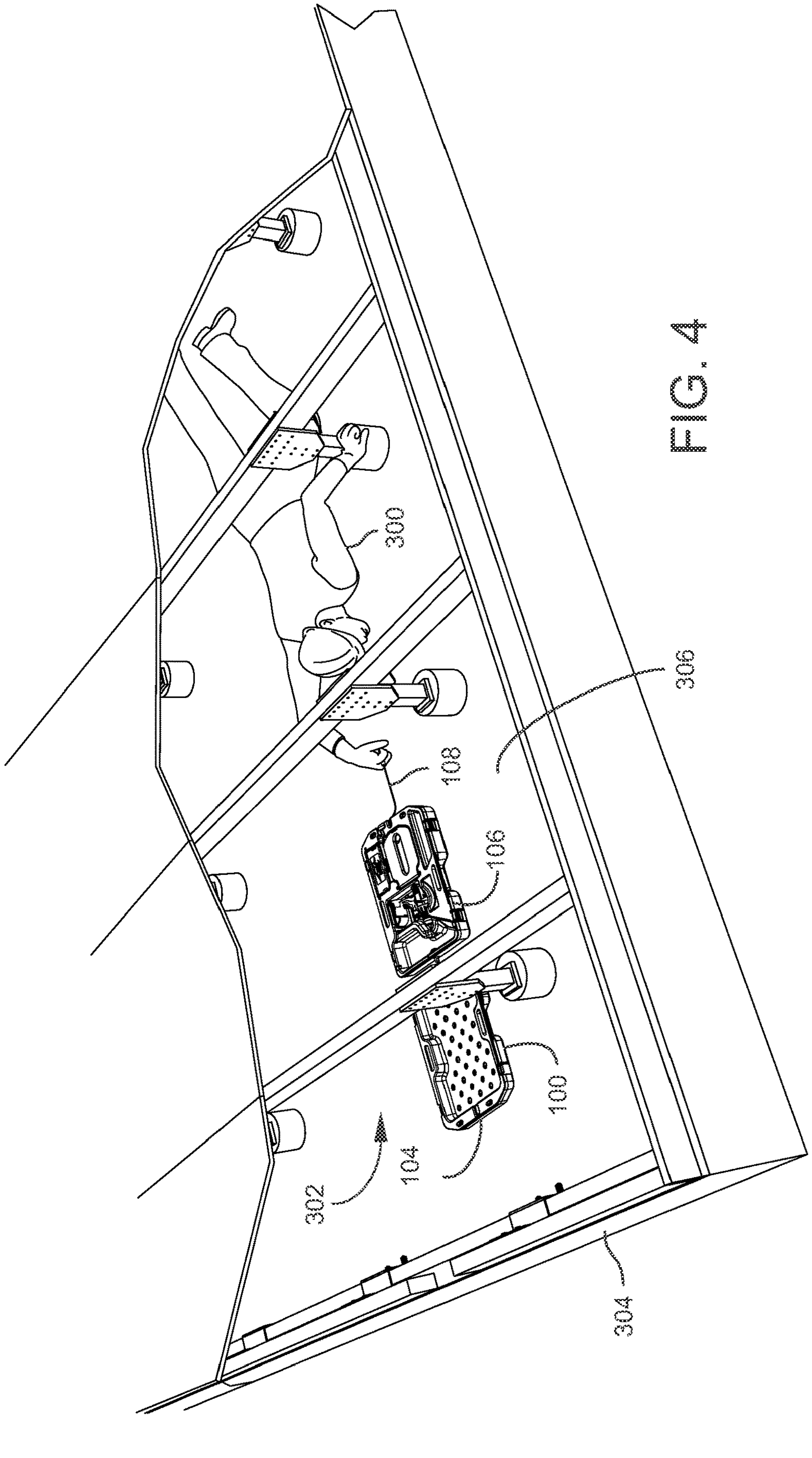
Figure 5:
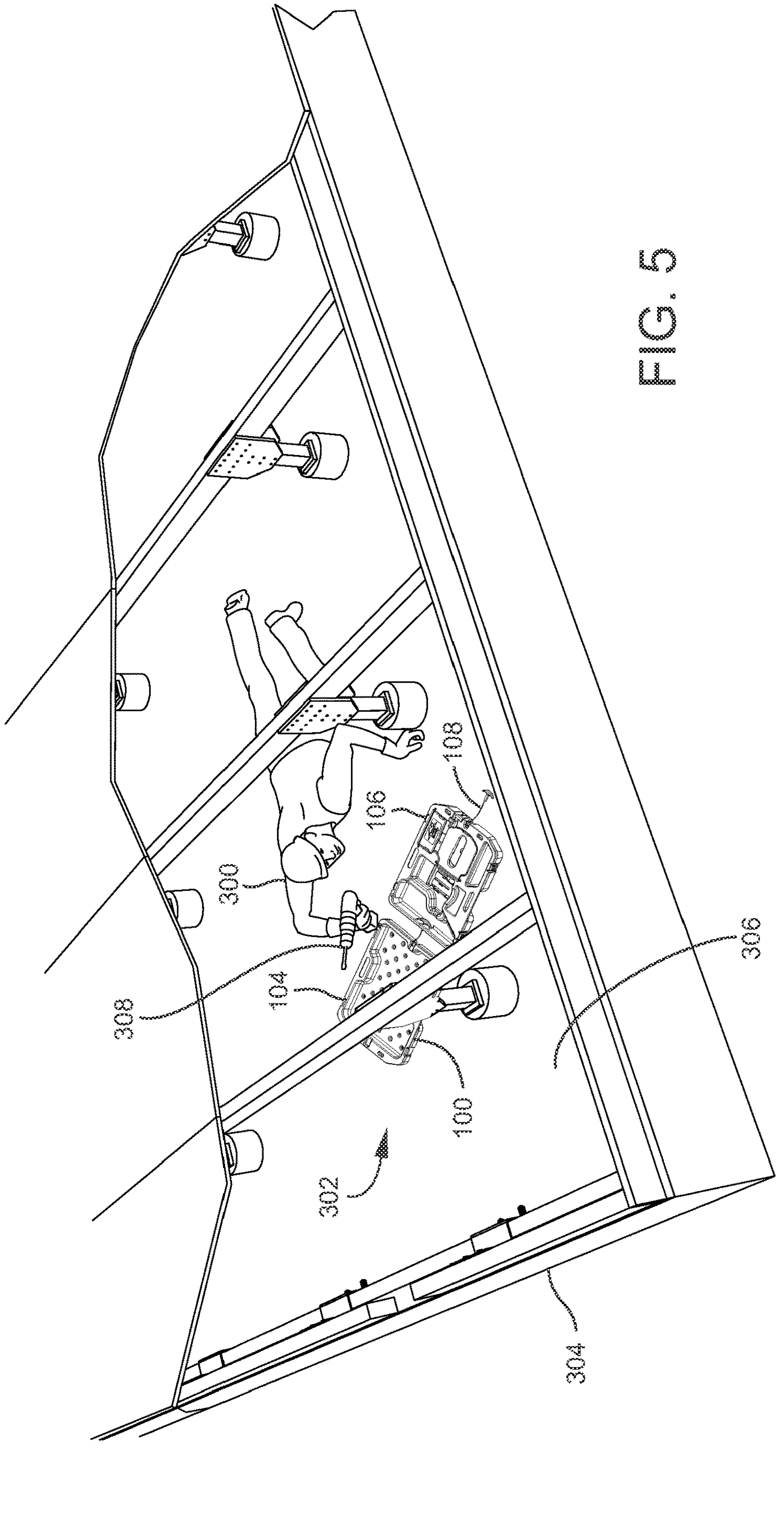
Figure 6:
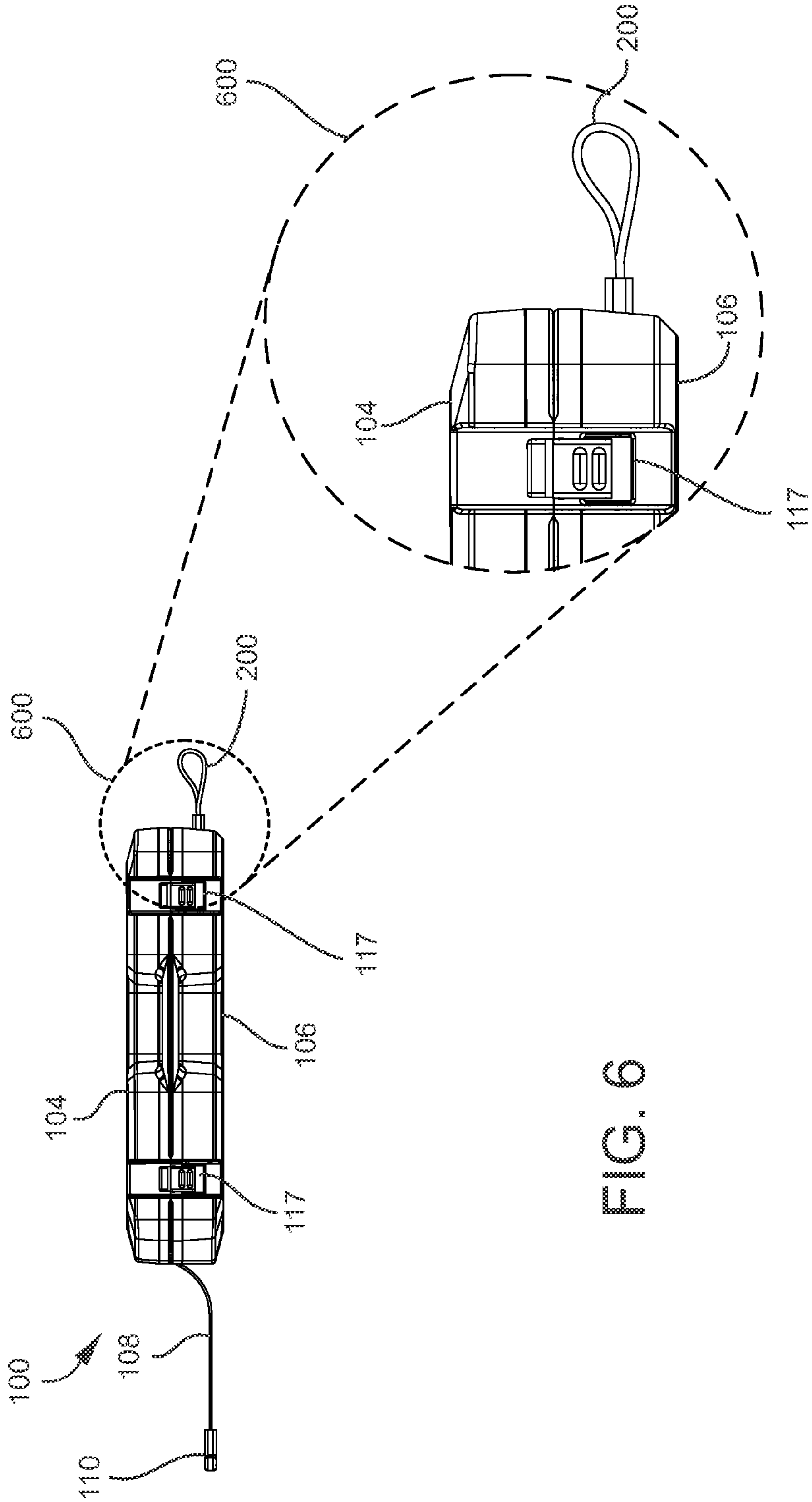
Figure 7:
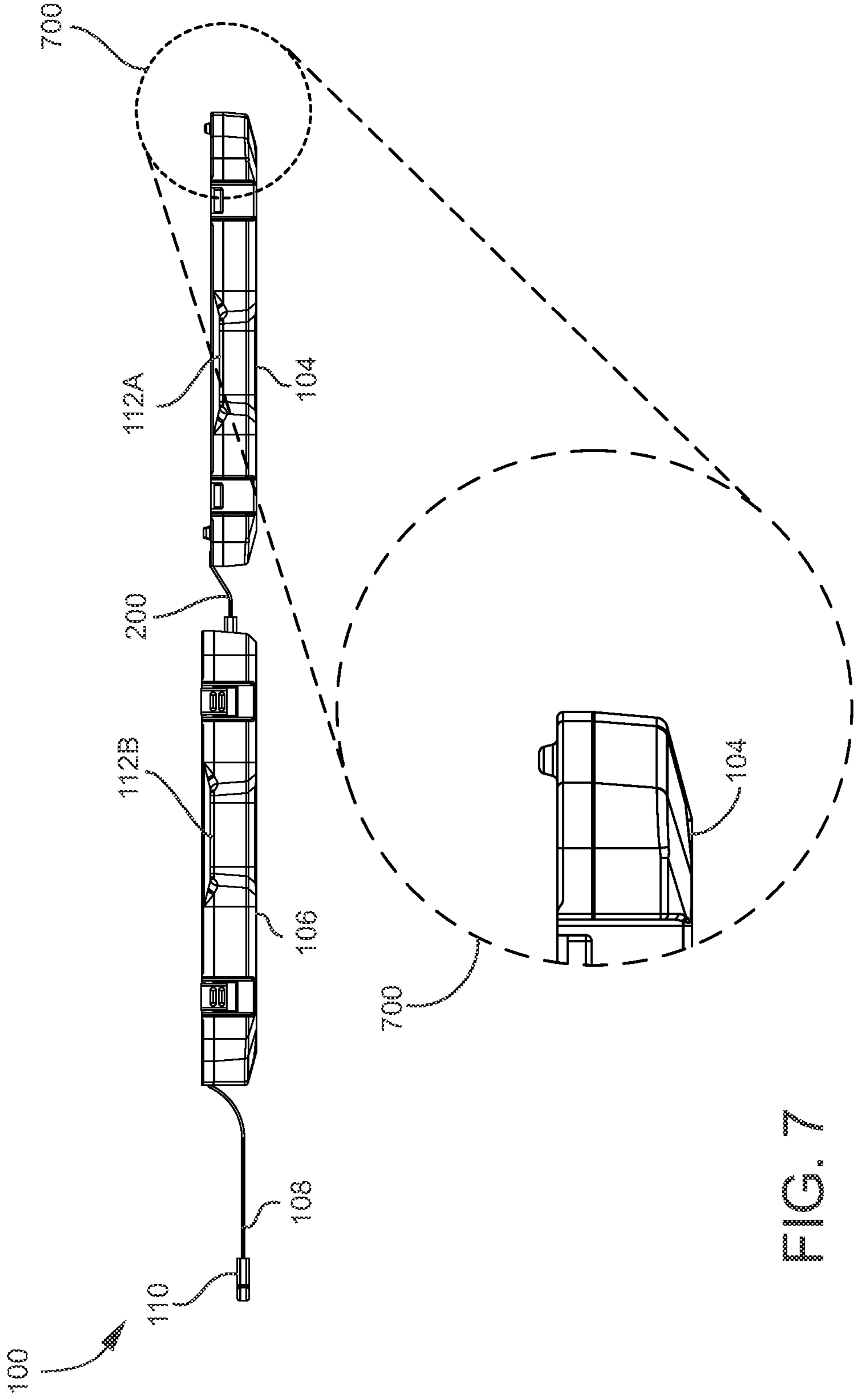
Figure 8:
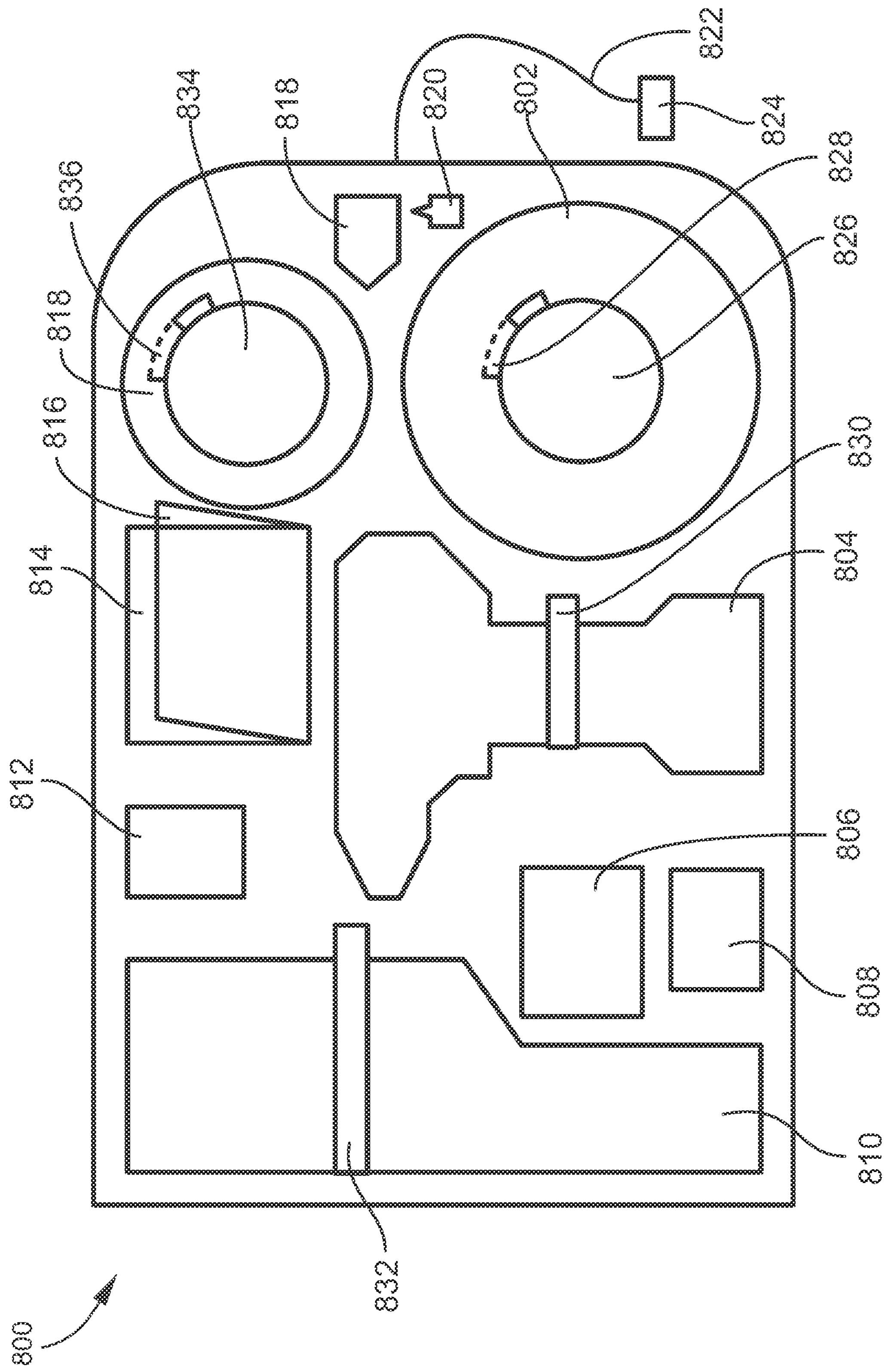
Figure 9:
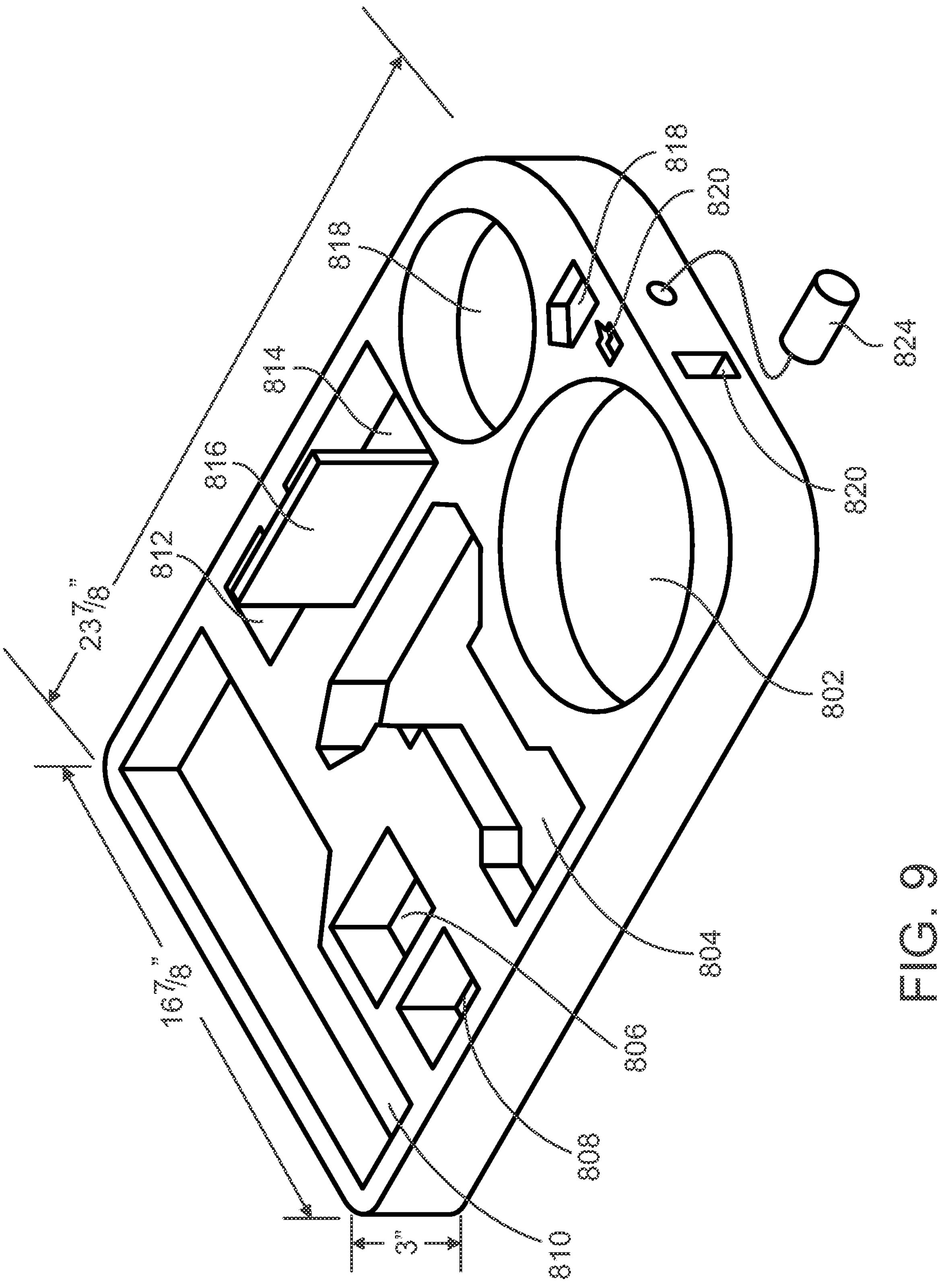
Figure 10:
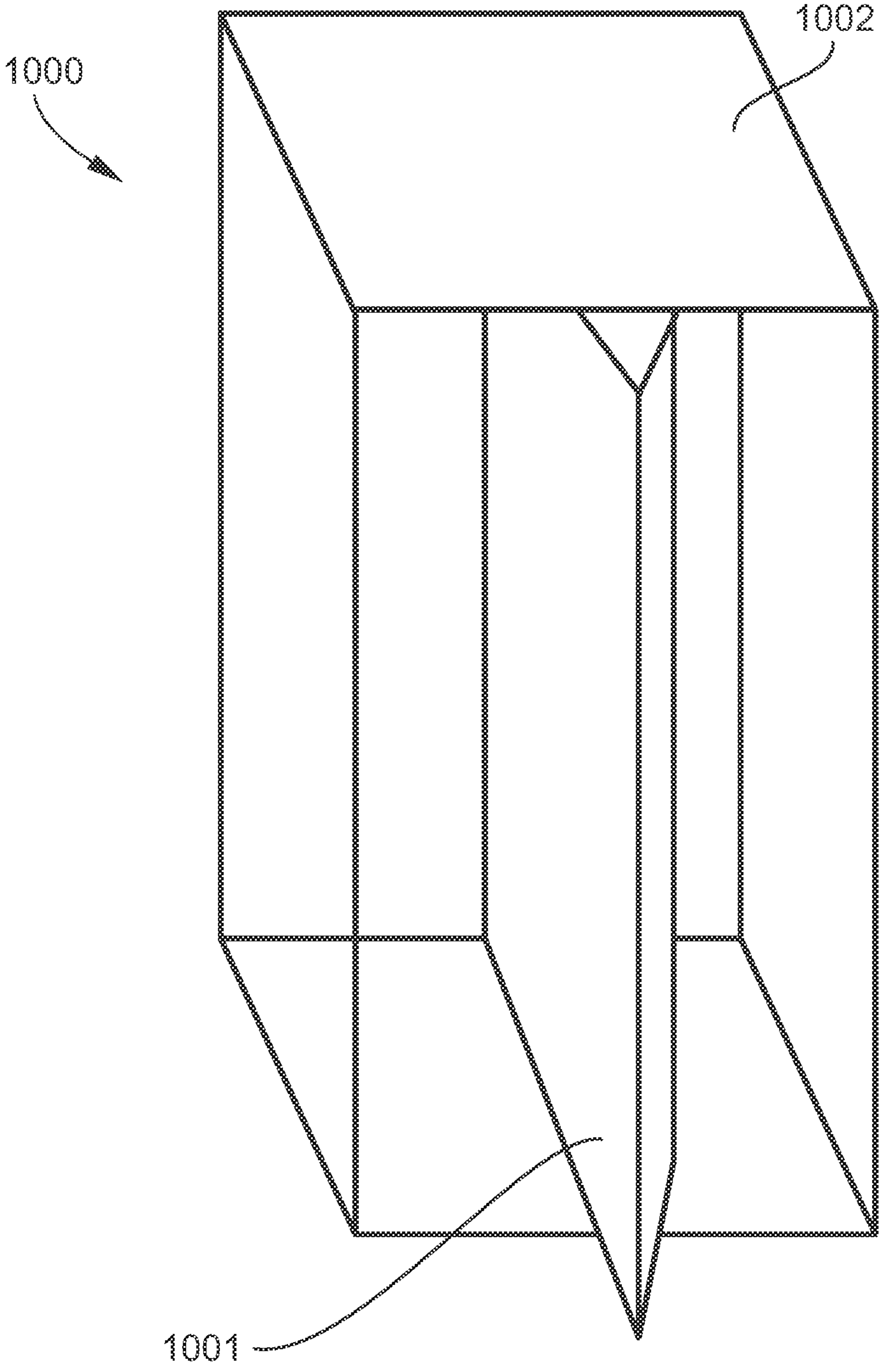
Figure 11:
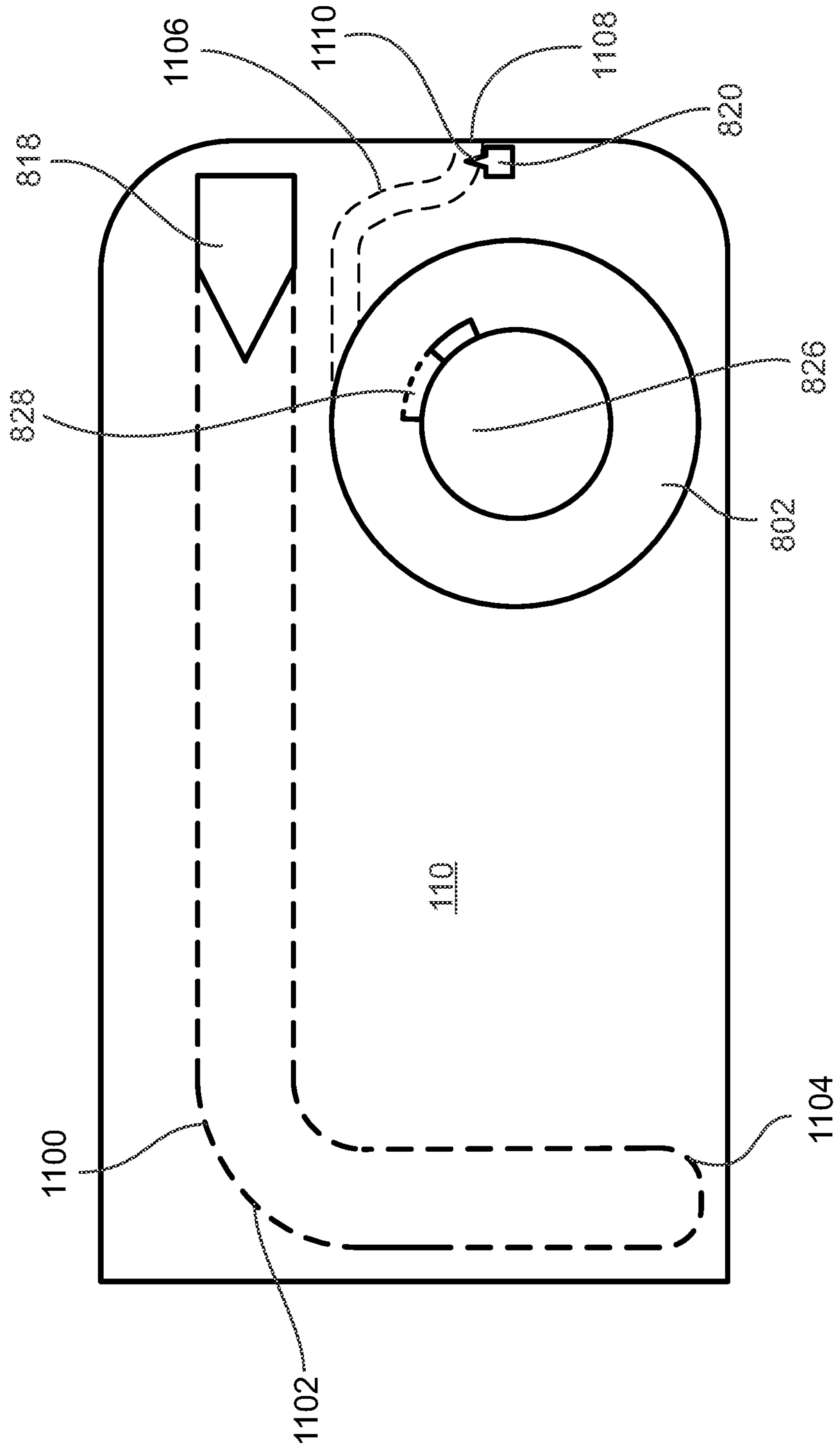
Figure 12C:
Figure 12B:
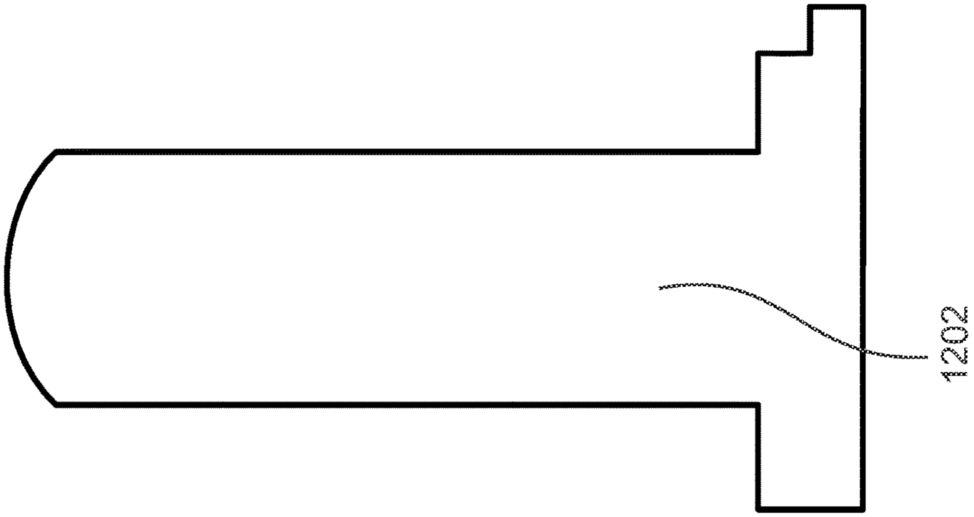
Figure 12A:
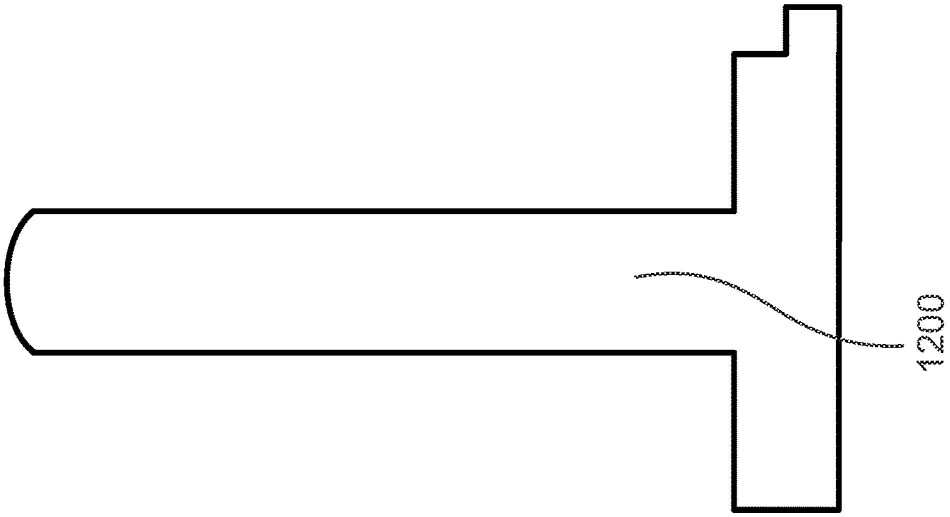
Figure 14A:
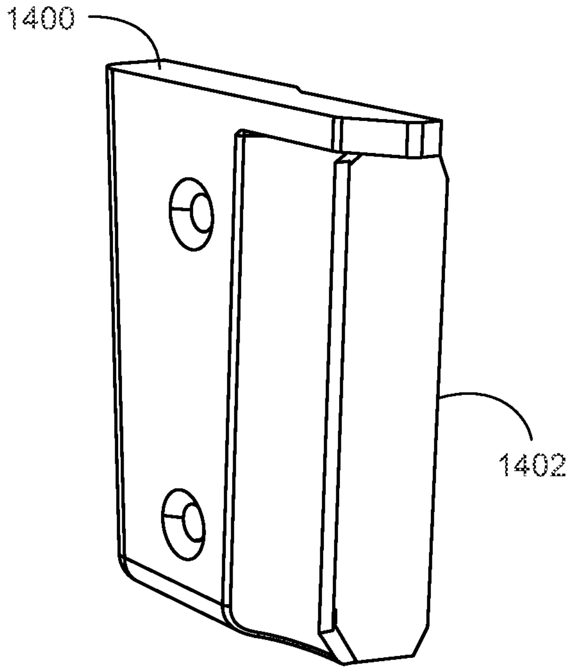
Figure 14B:
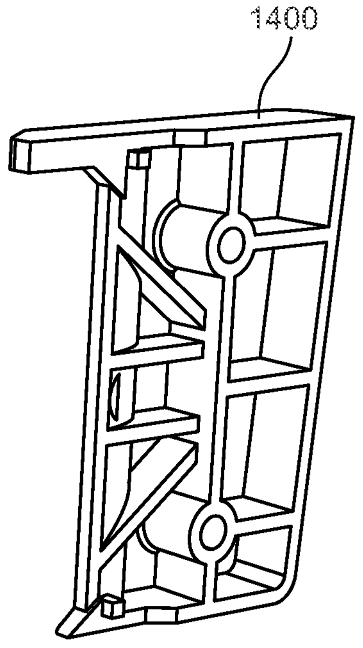
Figure 15A:
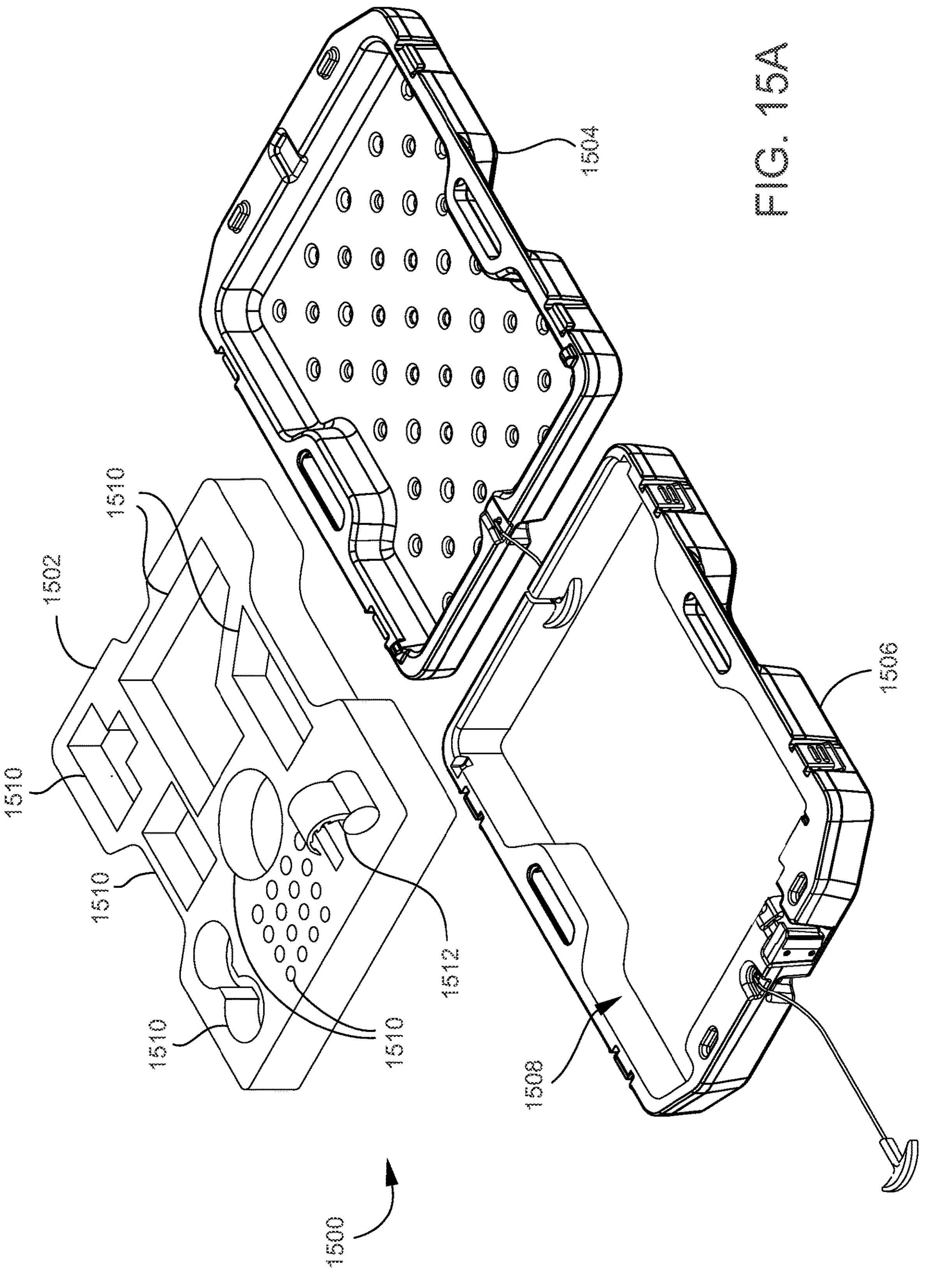
Figure 15B:
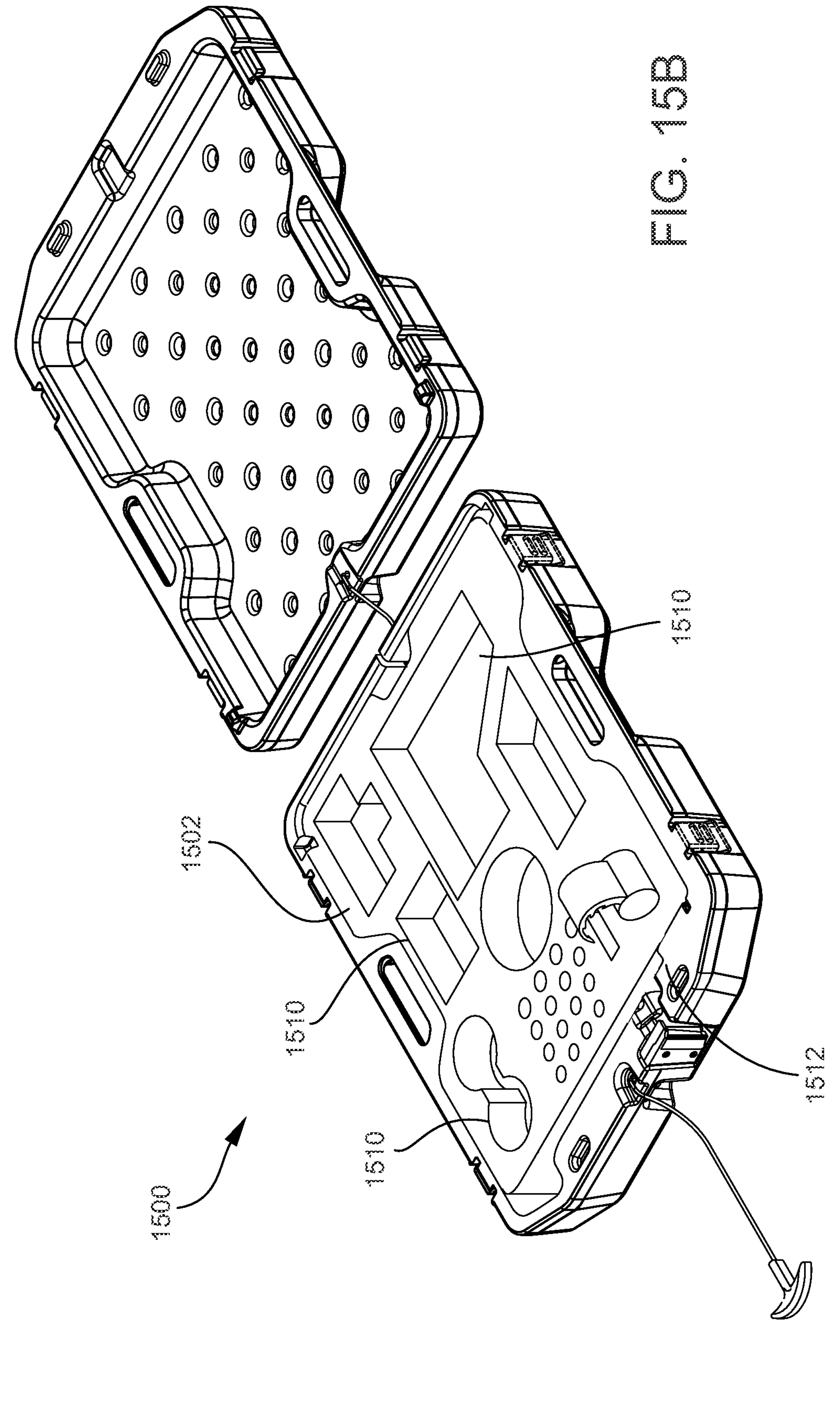
Figure 16:
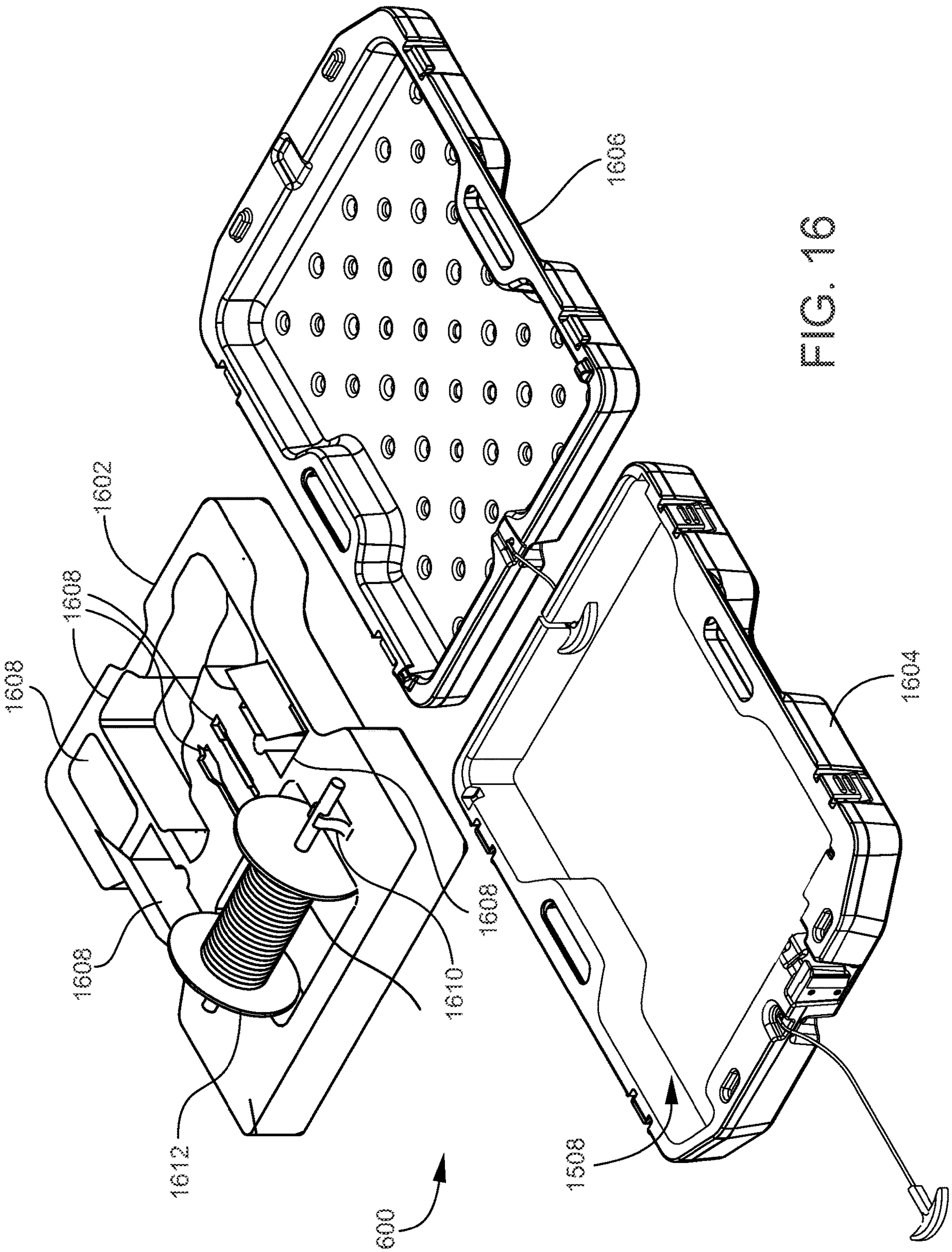
Figure 17A:
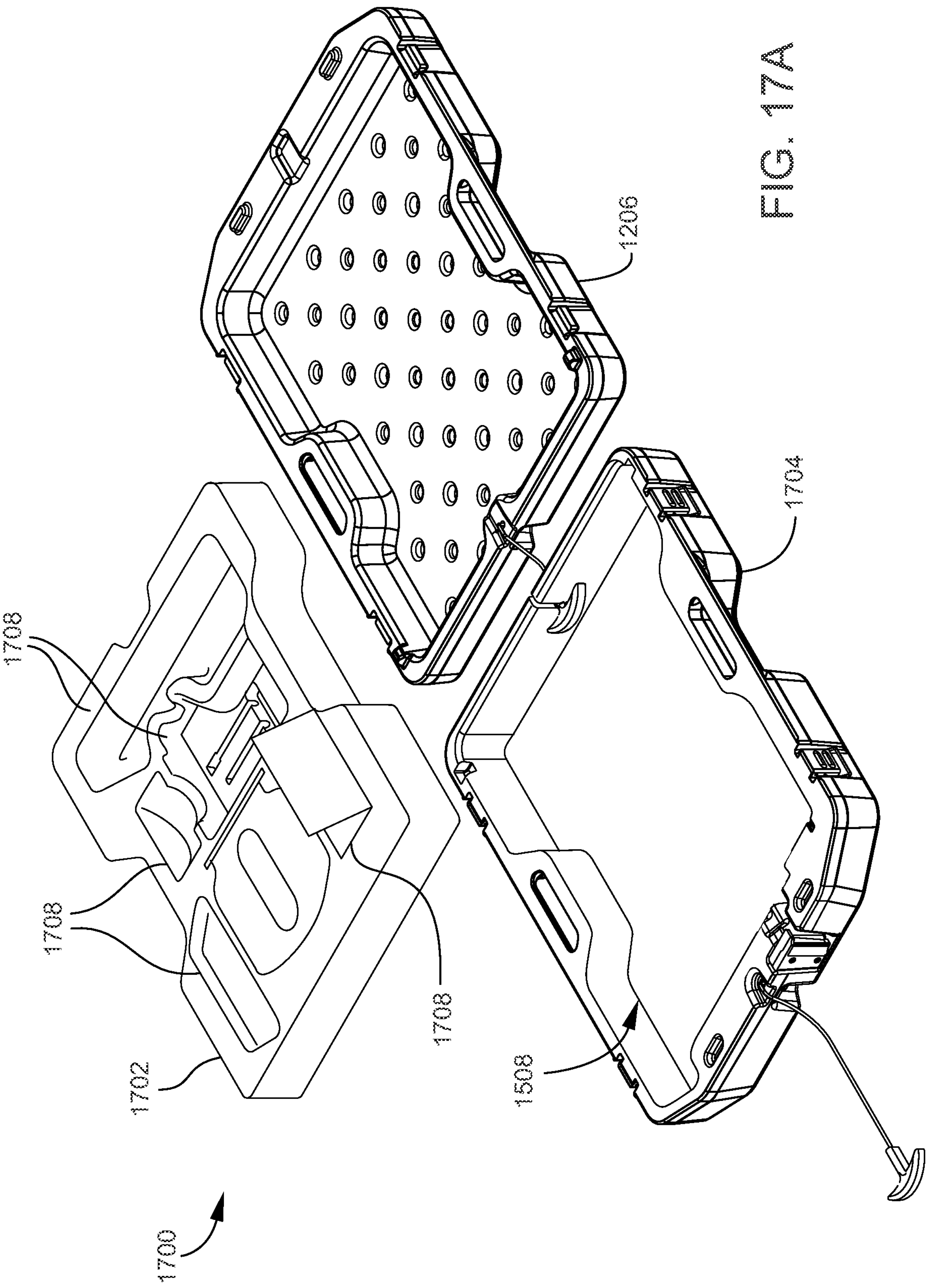
Figure 17B:
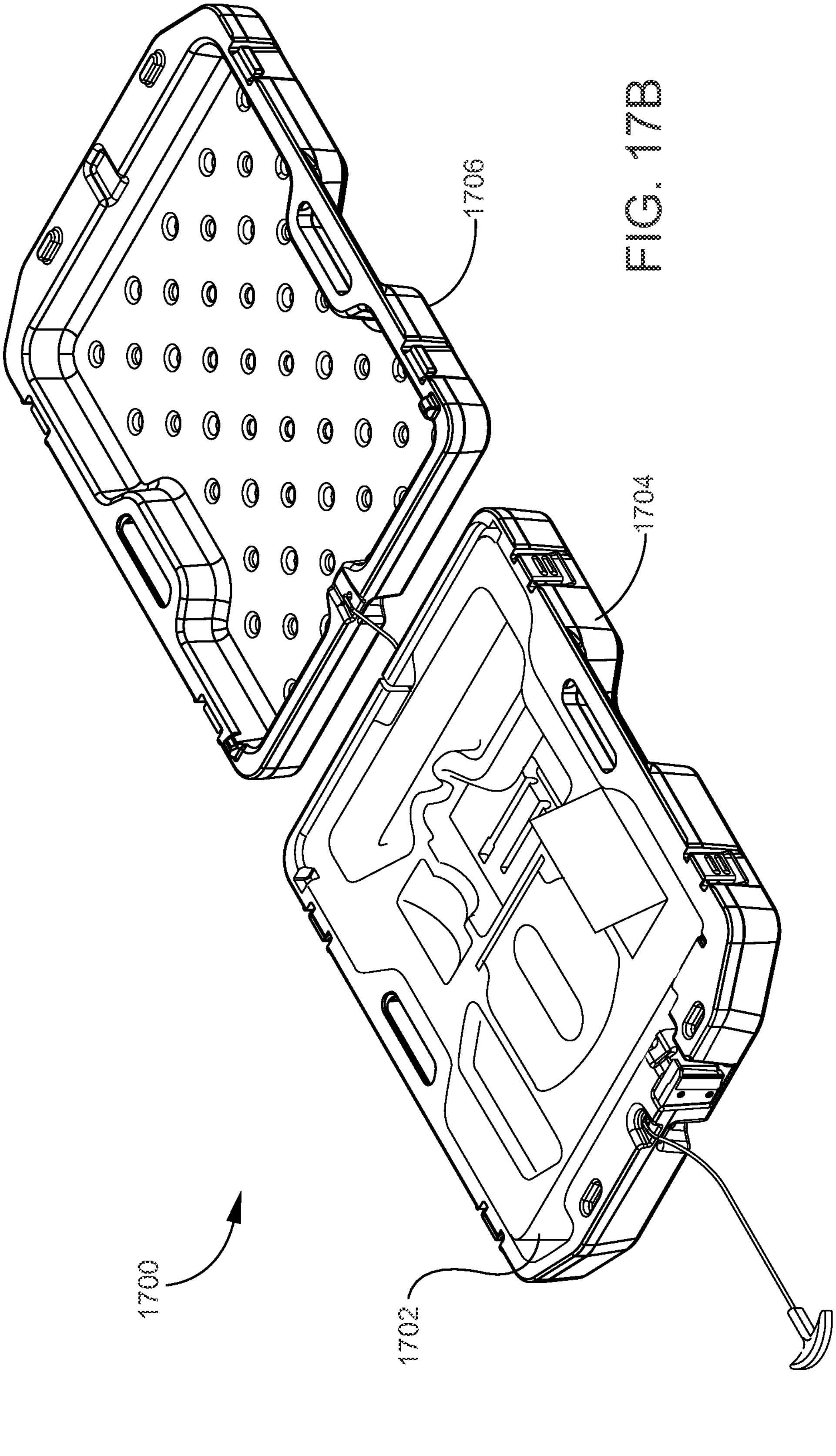

Having thus described the presently disclosed subject matter in general terms, reference will now be made to the accompanying Drawings, which are not necessarily drawn to scale, and wherein:

FIG. 1 is a top perspective view of a sled system for holding and transporting objects in accordance with embodiments;

FIG. 2 is a top perspective view of the system shown in FIG. 1 with the top and bottom portions and being in an open configuration;

FIGS. 3-5 are perspective views of the sled system being used by a worker in an example environment of use in accordance with embodiments of the present disclosure;

FIG. 6 illustrates a side view and a portion in zoomed view of the sled system 100 shown in FIGS. 1-5;

FIG. 7 illustrates a side view and a portion in zoomed view of the sled system shown in FIGS. 1-6;

FIG. 8 is a top view of a system for cutting stored materials;

FIG. 9 is a top perspective view of the system shown in FIG. 8;

FIG. 10 is a perspective view of a cutting mechanism for use with the system shown in FIGS. 8 and 9 in accordance with embodiments of the present disclosure;

FIG. 11 is a cross-sectional, top view of the system shown in FIGS. 8 and 9 in accordance with embodiments of the present disclosure;

FIGS. 12A, 12B, and 12C are side views of spool axles 1200, 1202, and 1204, respectively, of different sizes in accordance with embodiments;

FIGS. 13A-13E are different images depicting steps for dispensing and cutting duct webbing material with a system in accordance with embodiments of the present disclosure;

FIGS. 14A and 14B are perspective views of a razor cartridge in accordance with embodiments of the present disclosure;

FIGS. 15A and 15B are perspective views of a sled system having an insertable tray in a separated position and an inserted position, respectively, in accordance with embodiments of the present disclosure;

FIG. 16 illustrates a perspective view of a sled system having an insertable tray along with a top portion and a bottom portion for heating, ventilation, and air conditioning (HVAC) applications in accordance with embodiments of the present disclosure; and FIGS. 17A and 17B are perspective views of a sled system having an insertable tray in a separated position and an inserted position, respectively, for electrical work applications.

SUMMARY

The presently disclosed subject matter includes sled systems for cutting stored materials and for storing elongated and flexible supplies. According to an aspect, a system includes a sled comprising a body that defines a plurality of compartments for holding objects. Example objects include, but are not limited to, tools, supplies, tape, electronic devices, zip ties, spools of supplies or materials, and keys. The body further defines a channel that extends between one of the compartments and an opening. The system also includes a cutting mechanism positioned adjacent the channel and configured to cut and/or tear a material stored within the one of the compartments.

According to another aspect, a system includes a sled comprising a body that defines a plurality of compartments for holding objects. The body further defines a channel that extends between an opening of the body and an end of the channel. The channel can define a plurality of turns within the body. Further, the channel can store elongated and/or flexible supplies, such as zip ties.

As an example, the systems described herein can provide a user with the ability to organize tools, supplies, and personal items in an orderly manner due to combination of recessed compartments and storage channel. Such systems can also provide work space lighting capability, freeing the user from handheld luminance devices and head lamp devices. Further, for example, a strap cutter assembly can be provided to allow the user to cut duct webbing and/or similar materials with the use of one hand, giving the user an ability to perform more efficiently and effective. The presently disclosed subject matter can also provide the user with enhanced mobility via pull rope feature, allowing user greater ability to move from point A to B in confined crawlspaces while also reducing risk of losing tools, supplies, items, or other objects.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

As referred to herein, the term "object" can generally be any object of a suitable size and shape for carry by a system disclosed herein. Example objects include, but are not limited to, tools, supplies, tape, electronic devices, zip ties, spools of supplies or materials, keys, and the like.

As referred to herein, the term "sled" can be any transport system having one or more spaces or compartments for carrying object(s) and one or more bottom surfaces for traveling over a ground surface. A cord or rope may be attached to the sled, such as one of its ends, such that the sled may be pulled by a person or vehicle.

In accordance with embodiments, FIG. 1 illustrates a top perspective view of a sled system 100 for holding and transporting objects. Referring to FIG. 1, the sled system 100 includes a body 102 formed of a top portion 104 and a bottom portion 106. In this view, the top portion 104 is positioned on top of the bottom portion 102 for enclosing an interior space (not shown). The enclosure may be a sealed enclosure or substantially sealed enclosure for resisting or preventing the entry of moisture (e.g., water) or contaminants (e.g., soil) from entry into the enclosure. As will be described in more detail herein, objects may be held within the enclosure defined in the interior of the body 102 that is formed by placement of the top portion 104 on the bottom portion 106 as shown in FIG. 1.

Within continuing reference to FIG. 1, the sled system 100 includes a cord 108 attached to the bottom portion 106. Alternatively, for example, the cord 108 may be attached to the top portion 104 or any other part of the body 102. The cord 108 is attached at one end to the bottom portion 106. The cord 108 may be made of any suitable flexible material. The opposing end of the cord 108 can be attached to a handle 110. The handle 110 may be made of a suitable rigid material and ergonomically shaped for pull by a user.

Both the top portion 104 and the bottom portion 106 include handles 112A and 112B, respectively. In the configuration shown in FIG. 1, the handles 112A and 112B align to form a single handle for use to carry or otherwise maneuver the sled system 100. In the configuration with the top portion 104 being apart from the bottom portion as shown in FIG. 2, the handles 112A and 112B are separated for use to carry or otherwise maneuver the top portion and the bottom portion 106, respectively.

A top surface 113 of the top portion 104 defines a plurality of rails 115. The rails 115 can facilitate the sliding of the body 102 along a surface. The bottom portion 106 can include a similar surface that defines multiple rails (not shown in FIG. 1).

The sled system 100 includes multiple latches 117 for securely attaching the top portion 104 to the bottom portion 106. In FIG. 1, 2 latches 117 are shown on opposing sides of handles 112A and 112B. Also, another set of latches (not shown in FIG. 1) are similarly situated on an opposing side of the top portion 104 to the bottom portion 106. Alternatively, the top portion 104 can be attached to the bottom portion 106 by any suitable mechanism(s).

Now turning to FIG. 2, this figure illustrates a top perspective view with the top and bottom portions 104 and 106 being in an open configuration. In FIG. 2, it can be seen that the sled system 100 also includes a second set of handles 114A and 114B that are a part of or attached to top portion 102A and 102B, respectively. The handles 114A and 114B are apart for use to carry or otherwise maneuver the top portion and the bottom portion 106, respectively. In the configuration shown in FIG. 1, the handles 114A and 114B align to form a single handle for use to carry or otherwise maneuver the sled system 100. The handles 114A and 114B are positioned on an opposing side of the body 102 as the handles 112A and 112B.

With continuing reference to FIG. 2, the top portion 104 and the bottom portion 106 are attached together by a cord 200. In this example, the cord 200 may have an end affixed to the top portion 104. An opposing end of the cord 200 may be attached to an anchoring component 202. The anchoring component 202 and its end of the cord 200 may be slipped into a notch 204 defined in the bottom portion 102 for attachment of the top portion 104 to the bottom portion 102. The anchoring component 202 and its cord end may be removed from the notch 204 for releasing the top portion 104 from attachment to the bottom portion. Alternatively, the top portion 104 and the bottom portion 102 may be attached together in any suitable manner.

The top portion 104 and the bottom portion 106 may be made of injection molded plastic. Alternatively, the top portion 104 and the bottom portion 106 may be made of any other suitable type of material. Further, the top portion 104 and the bottom portion 106 may be otherwise suitably shaped and sized.

The bottom portion 106 includes multiple compartments 206, 208, 210, 212, 214, and 216 for holding objects. The compartments 206, 208, 210, 212, 214, and 216 can be closed for secure transport or hold of the objects when the top portion 104 is placed on top of the bottom portion 106 as shown in FIG. 1. In the configuration of FIG. 1, the top portion 104 can cover the objects in order to secure them from becoming loose from the sled system 100 and possibly lost. Also, the top portion 104 can provide protection to the objects due to its covering.

Compartment 206 is configured for holding and carrying objects of various sizes. In this example, the compartment 206 can be defined in the bottom portion 106 and have a bottom surface 218 on which objects can rest. The material defining the bottom surface 218 or a material underneath the bottom surface 218 may be magnetic for holding metallic objects (e.g., screws, bolts, washers, keys, etc.).

Compartment 208 is configured to hold a spool of supplies or materials. For example, the compartment 208 can have a cover 218 under which a chamber hub and an axle lock chamber is positioned. The cover 218 may have a hinge 219 at one end and a latch 221 at an opposing end. The cover 218 may hold the spool in place and may be opened to add material. The cover 218 may define a window 220 so a user can view the contents of the compartment 208.

Compartment 210 is configured to a cylindrically-shaped objected such as a roll of tape. For example, a tape of material may be seated in an upright position. Alternatively, the compartment 210 may be used to hold any other suitably shaped and sized object.

Compartment 212 is configured to hold an electronic device or any other suitably shaped and sized object. The compartment 212 include a cover 223 having a hinge 225 and a latch 227 for opening and closing the cover 223. Example electronic devices that may be stored in the compartment 212 include, but are not limited to, a mobile phone or other computing device.

Compartment 214 is configured to hold a drill, drill bits, and/or any other suitably shaped and sized objects. The compartment 214 can define multiple indentions 229 for holding drill bits. Also, the compartment 214 can define a larger indention 231 for holding a drill. During placement, the drill bits may be situated beneath the drill.

Component 216 is configured to hold one or more other objects. The bottom portion 206 defines the walls of the compartment 216.

The bottom portion 106 defines an opening 232. The opening 223 provides access to a channel (not shown in FIG. 2) defined within the bottom portion 106. The channel can store one or more cable ties (also referred to as a hose tie, a zip tie, or a tie wrap), which are a type of fastener for holding items together. An end of the cable tie(s) may be accessible through opening 232 or extend outside of the opening 232.

The bottom portion 106 also defines another opening 234 positioned adjacent a cutting mechanism 236. The opening 234 provides access to another channel (not shown in FIG. 2) defined within the bottom portion 106 that leads to compartment 208. The supplies in the compartment 208 can be a webbing material or any other elongated material with an end positioned for grasping by a user at opening 234. The end can be pulled to unspool the material to a desired length and then cut by the cutting mechanism 236. The cutting mechanism 236 can include a cartridge having a razor with its sharp edge facing the opening or otherwise oriented for cutting material extending from the opening 234.

Turning again to FIG. 1, the figure includes a zoomed view (indicated by reference number 123) of the cutting mechanism with the inclusion of a person's hand 119 pulling webbing material 121 from the opening 234. This is the material stored within compartment 208.

FIGS. 3-5 illustrate perspective views of the sled system 100 being used by a worker 300 in an example environment of use in accordance with embodiments of the present disclosure. In this example, the sled system 100 is being used in a crawlspace 302 of a building 304, but it may alternatively be used in any suitable environment. Now turning to FIG. 3, the sled system 100 is in a closed configuration with the top and bottom portions 104 and 106 being attached together for transport. Here, the worker 300 is pulling the cord 108 such that the bottom surface of the bottom portion 106 slides along the ground 306 to a desired location, such as a work area.

Subsequent to the sled system 100 being moved to the desired location, the worker 300 can open the sled system 100 such that the top and bottom portions 104 and 106 are in the open configuration as shown in FIG. 4. Once opened, the compartments can be accessed by the worker 300. For example, the worker 300 can access the drill 308 positioned in its compartment. As shown in FIG. 5, the worker 300 has accessed the drill 308. The worker 300 may also access any other tools or objects held by the sled system 100. After completing work, the worker 300 can close the top portion 104 onto the bottom portion 106 as shown in FIG. 3 so that the sled system 100 can be slid across the ground 306 and removed from the crawlspace 302.

FIG. 6 illustrates a side view and a portion in zoomed view of the sled system 100 shown in FIGS. 1-5. Referring to FIG. 6, the zoomed view area is indicated by reference number 600. The sled system 100 is shown in a closed configuration.

FIG. 7 illustrates a side view and a portion in zoomed view of the sled system 100 shown in FIGS. 1-6. Referring to FIG. 7, the zoomed view area is indicated by reference number 700. The sled system 100 is shown in an open configuration.

In accordance with other embodiments, FIG. 8 illustrates a top view of a system for cutting stored materials. Referring to FIG. 8, the system includes a sled 800. The sled 800 has a body that defines multiple compartments 802, 804, 806, 808, 810, 812, 814, and 818 and an opening on a side and its position designated by reference numeral 820 (shown in FIG. 9).

The body of the sled 800 also defines a portion 818 of a channel for storing elongated and/or flexible supplies (for example, zip ties). The channel may include another portion (not shown) that extends between two or more of the compartments. The channel may have multiple turns for accommodating a length of a zip tie, which may be up to 36 inches long or longer. The portion 818 may also form an opening where an end of one or more of the supplies can extend for grasp by a technician. When one is pulled out, others can remain stored in the channel.

Compartment 802 is a recessed duct webbing spool compartment. Compartment 802 can have a webbing chamber hub 826 and an axle lock chamber 828. Duct webbing material may be pulled from a spool and a portion cut by use of a cutting mechanism 820. Particularly, cutting mechanism 820 can have a housing and a blade positioned for cutting the duct webbing material when pulled in position near the blade. The cutting mechanism 820 can cut and/or tear a material stored within the compartment 802.

Compartment 804 can hold a drill (not shown). A strap 830 may be affixed to the sled 800 for holding a drill within the compartment 804.

Compartment 806 can have a magnetic portion for holding a metal item in place. For example, the compartment 806 can hold nuts, bolts, screws, supplies, drill bits & assortment of various items of similar kind.

Compartment 808 is a recessed cavity for holding a work light. For example, the technician has the ability to illuminate work area via a removable LED light assembly located within compartment 808.

Compartment 810 is a recessed cavity that forms a tray for holding tools and supplies. A strap 832 may be affixed to the sled 800 for holding tools and/or supplies within the compartment 810. Utilization of compartment 810 can reduce risk of misplaced tools and items.

Compartment 812 is another recessed cavity for holding a work light.

Compartment 814 is a recessed cavity that can hold an electronic device (e.g., smartphone) and/or other items. A compartment lid 816 can cover the cavity for protecting the stored items. For example, the lid 816 can be configured to seal the compartment such that dirt, debris, contaminants, or moisture cannot enter.

Compartment 818 is a recessed tape spool compartment. The compartment 818 can include a tape chamber hub 834 and an axle lock chamber 836 for use in facilitating dispensing of tape.

Within continuing reference to FIG. 8, the system includes a pull rope or cord 822 attached to the sled 800. The cord 822 may be made of any suitable material such as NYLON™ material. Further, a pull handle 824 can be attached to an end of the cord 822 for pull by the technician or worker. The handle 824 may be made of a polymer or plastic, or other suitable material.

FIG. 9 illustrates a top perspective view of the system shown in FIG. 8. Referring to FIG. 9, example dimensions are shown. It should be understood that the system may have any other suitable dimensions, size, shape, and compartments.

FIG. 10 illustrates a perspective view of a cutting mechanism 1000 for use with the system shown in FIGS. 8 and 9 in accordance with embodiments of the present disclosure. Referring to FIG. 10, the cutting mechanism 1000 can include a strap cutter assembly 1002 and an interchangeable razor blade 1004 attached thereto. The cutting mechanism 1000 may be situated within the system as shown in FIGS. 8 and 9. Further, the blade 1004 may be replaced with another blade. The cutter assembly 1002 is positioned such that a technician can cut desired section of strap by use of one hand.

FIG. 11 illustrates a cross-sectional, top view of the system shown in FIGS. 8 and 9 in accordance with embodiments of the present disclosure. Referring to FIG. 11, the portion 818 shown in FIG. 8 is shown and also a channel 1100 defined within the body of the sled 800. This channel 1100 can extend between two or more compartments. Further, the channel 1100 defines a turn 1102 so that a long length of zip tie can fit. The channel 1100 terminates at end 1104. Although only one turn is shown in the example of FIG. 11, it should be understood that multiple turns may be defined in order to extend the length of material that may be accommodated.

With continuing reference to FIG. 11, another channel 1106 is defined in the interior of the sled body that extends from opening 1108 to compartment 802. The cutting mechanism 820 is positioned adjacent the channel 1106 for cutting and/or tearing a material stored within the compartment 802. A tip of the blade 1110 extends into the channel 1106.

FIGS. 12A, 12B, and 12C illustrate side views of spool axles 1200, 1202, and 1204, respectively, of different sizes in accordance with embodiments. For example, the spool sizes in FIGS. 12A, 12B, and 12C are ½ inches, 1.5 inches, and 2.5 inches, respectively. These spool axles 1200, 1202, and 1204 may be interchangeably used with the webbing chamber hub of FIGS. 8 and 9 to accommodate webbing spools of different sizes.

Figure 13A:
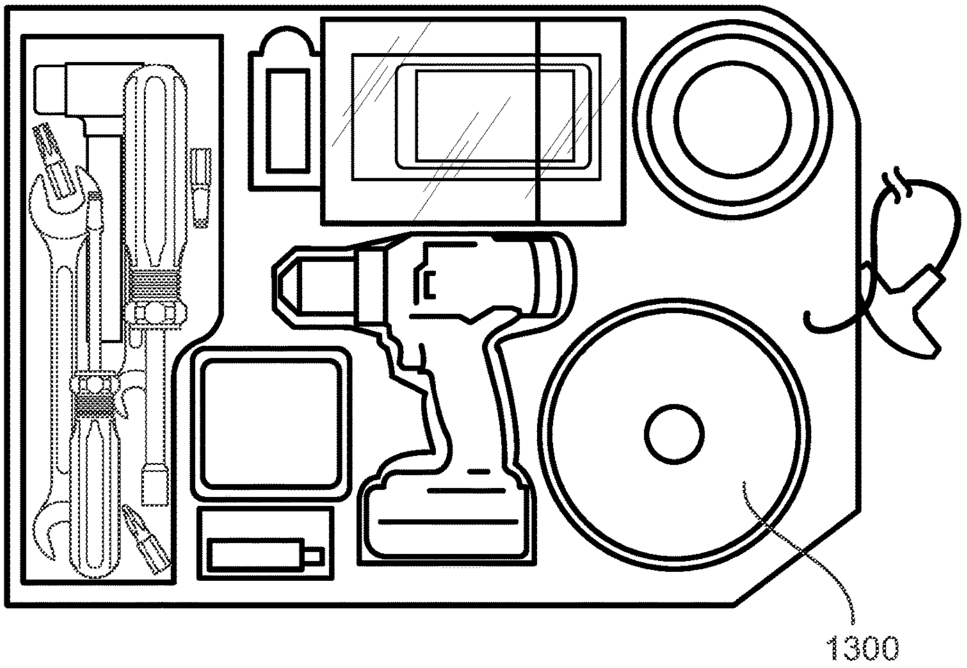
Figure 13B:
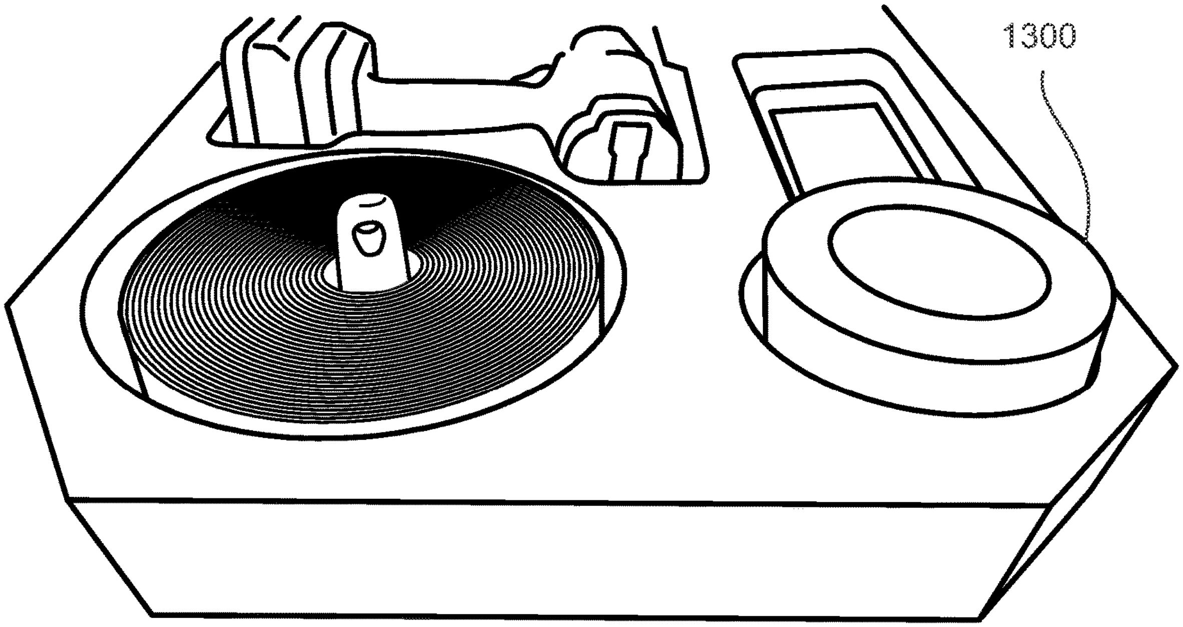

FIGS. 13A-13E are different images depicting steps for dispensing and cutting duct webbing material 1300 with a system in accordance with embodiments of the present disclosure. Referring initially to FIG. 13A, the figure shows a top view of the system with various objects including the material 1300 in its compartments. FIG. 13B shows that an end of the material 1300 is pulled through an opening for grasp by a worker's hand 1302.

Figure 13C:
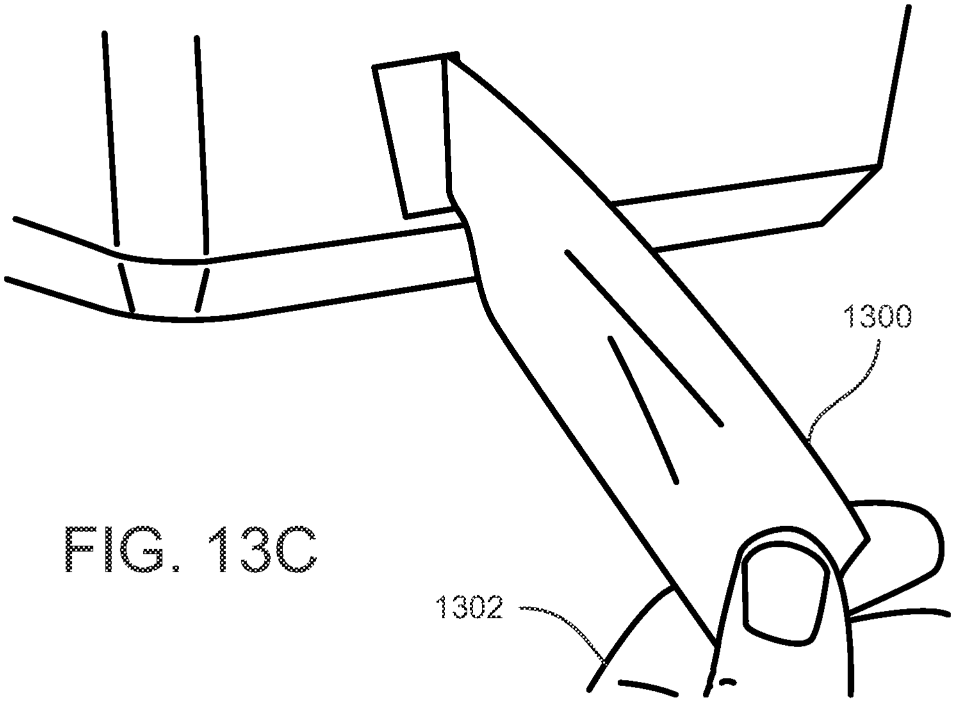
Figure 13D:
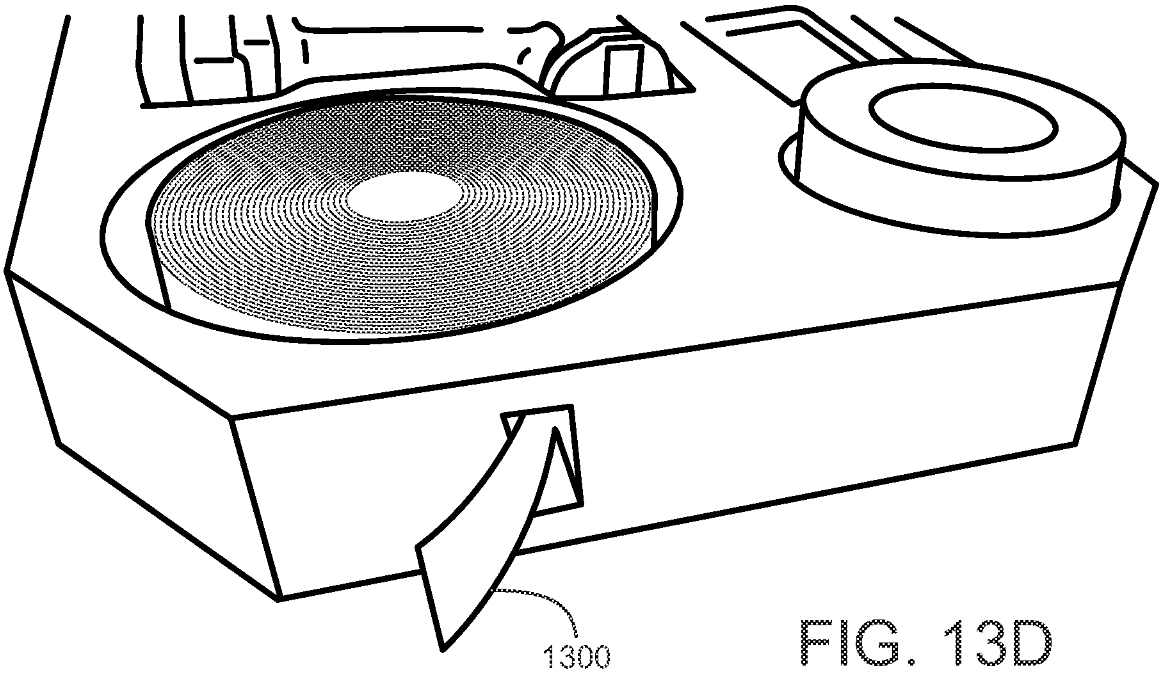
Figure 13E:
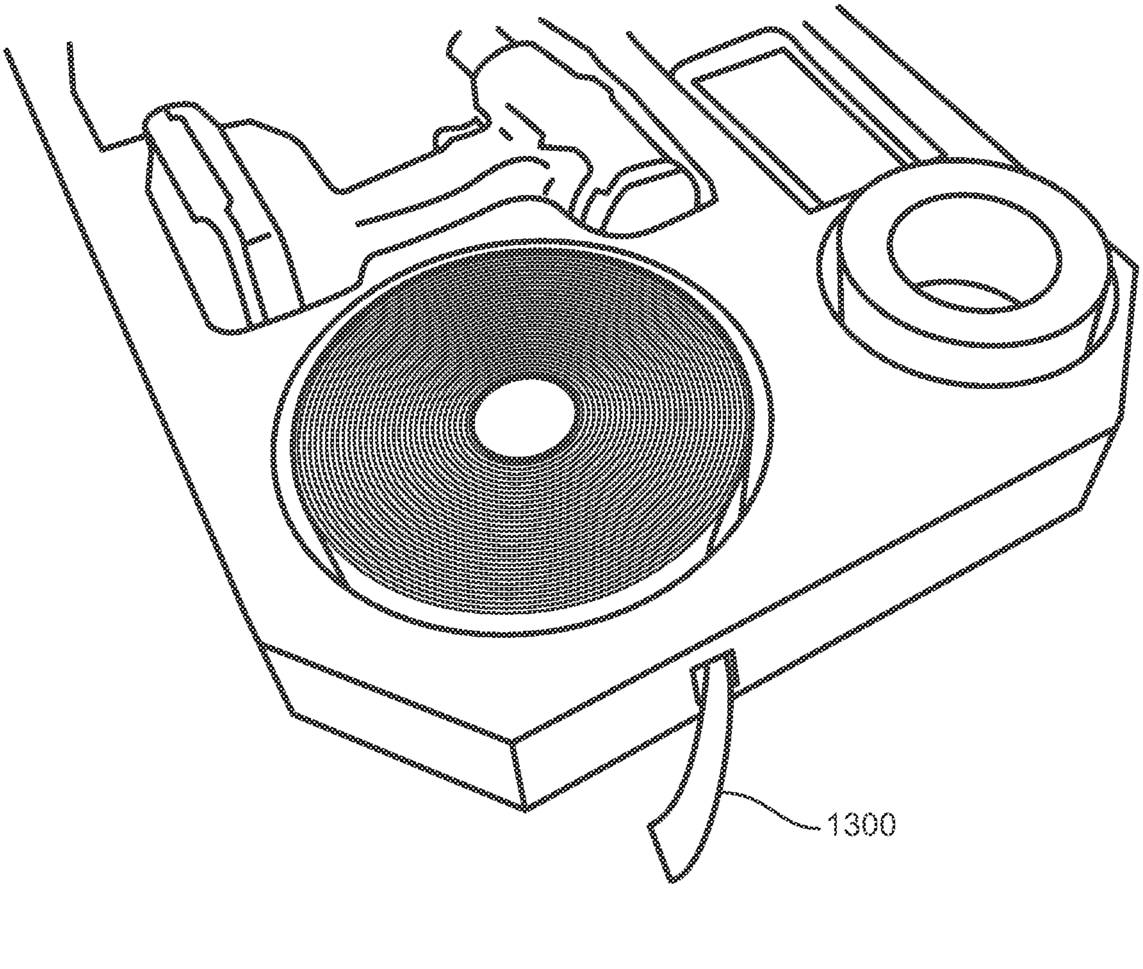

FIG. 13C shows that the technician's hand has pulled a length of the material 1300 from out of the opening. This length may be an estimated amount of the material needed for a project. Subsequently, this length of material 1300 may be cut by the technician by use of a tool or by use of a cutting mechanism of the system as described in examples herein. FIGS. 13D and 13E show different views of the system beside the length of material 1300 subsequent to being cut.

FIGS. 14A and 14B illustrate perspective views of a razor cartridge 1400 in accordance with embodiments of the present disclosure. Referring to FIGS. 14A and 14B, the razor cartridge 1400 can be used with the sled system 100 shown in FIG. 1 for example. FIG. 14A shows a top view of the razor cartridge 1400 with a blade 1402 attached thereto. FIG. 14B shows a bottom view of the razor cartridge 1400 without a blade being attached.

In accordance with embodiments, FIGS. 15A and 15B illustrate perspective views of a sled system 1500 having an insertable tray 1502 in a separated position and an inserted position, respectively. Referring particularly to FIG. 15A, the sled system 1500 includes a top portion 1504 and a bottom portion 1506 that can be closed together for enclosing objects, such as tools, as described herein. The bottom portion 1506 defines an interior space (generally designated 1508) shaped and sized for receiving the insertable tray 1502. The insertable tray 1502 includes several compartments 1510 for receiving objects, such as tools and supplies. The insertable tray 1502 also includes a mechanical feature 1512 for holding tape material. This particular example may be utilized for plumbing work applications.

Now turning to FIG. 15B, this figure shows the insertable tray 1502 as being inserted into position in the bottom portion 1506. The tray 1502 is removable so that other types of trays may be inserted depending on use.

In accordance with embodiments, FIG. 16 illustrates a perspective view of a sled system 1600 having an insertable tray 1602 along with a top portion 1602 and a bottom portion 1604 for heating, ventilation, and air conditioning (HVAC) applications. Referring particularly to FIG. 16, the bottom portion 1604 defines an interior space 1508 for holding the tray 1602. The tray 1602 defines a number of compartments 1608 for holding objects. Further, the tray 1602 includes holders 1610 for supporting and securing a wire reel 1612.

In accordance with embodiments, FIGS. 17A and 17B illustrate perspective views of a sled system 1700 having an insertable tray 1702 in a separated position and an inserted position, respectively, for electrical work applications. Referring particularly to FIG. 17, the system 1700 includes a bottom portion 1704 that can be enclosed by a top portion 1706. The bottom portion 1704 defines an interior space 1508 for holding the tray 1702. The tray 1702 defines a number of compartments 1708 for holding objects.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system comprising:

a sled comprising a body that defines a plurality of compartments for holding objects, wherein the body comprises a top portion and a bottom portion, wherein the plurality of compartment are defined within the bottom portion, wherein the body further defines a channel having a first end and a second end, wherein the channel is connected to one of the compartments at the first end, and wherein the channel is connected to an opening at the second end, wherein in a closed configuration, the top portion is positioned over the compartments for substantially enclosing the compartments, and wherein in an open configuration, the top portion and the bottom portion are apart such that the compartments are accessible;

a cord including a first end and a second end, wherein the first end of the cord is attached to the top portion, wherein the second end of the cord is attached to the bottom portion, and wherein in the open configuration the top portion is rotatable with respect to the bottom portion in a plurality of directions via attachment of the top portion to the bottom portion; and a cutting mechanism positioned adjacent the channel and configured to cut and/or tear a material stored within the one of the compartments.

2. The system of claim 1, wherein the objects are selected from the group consisting of tools, supplies, tape, electronic devices, zip ties, spools of supplies or materials, and keys.

3. The system of claim 1, further comprising another cord attached to the body of the sled for pull of the sled.

4. The system of claim 1, wherein the bottom portion of the body of the sled defines a substantially flat, lower surface for sliding across a ground surface.

5. The system of claim 1, wherein the plurality of compartments each define an opening that face in a substantially upward direction.

6. The system of claim 1, wherein the cutting mechanism comprises a blade that extends into the channel.

7. The system of claim 1, wherein the channel defines a turn adjacent the cutting mechanism.

8. The system of claim 1, wherein the channel defines a plurality of turns.

9. The system of claim 1, wherein the one of the compartments is substantially cylindrical in shape.

10. The system of claim 1, wherein the top portion and the bottom portion are releasably attached to each other.

11. The system of claim 1, wherein the plurality of compartments is a first plurality of compartments, and wherein the sled defines an interior space for holding an insertable tray that defines a second plurality of compartments.

12. A system comprising:

a sled comprising a body that defines a plurality of compartments for holding objects, wherein the body comprises a top portion and a bottom portion, wherein the plurality of compartment are defined within the bottom portion, wherein the body further defines a channel having a first end and a second end, wherein the channel is connected to one of the compartments at the first end, and wherein the channel is connected to an opening at the second end, wherein in a closed configuration, the top portion is positioned over the compartments for substantially enclosing the compartments, and wherein in an open configuration, the top portion and the bottom portion are apart such that the compartments are accessible; and a cord including a first end and a second end, wherein the first end of the cord is attached to the top portion, wherein the second end of the cord is attached to the bottom portion, and wherein in the open configuration the top portion is rotatable with respect to the bottom portion in a plurality of directions via attachment of the top portion to the bottom portion.

13. The system of claim 12, wherein the objects are selected from the group consisting of tools, supplies, tape, electronic devices, zip ties, spools of supplies or materials, and keys.

14. The system of claim 12, further comprising another cord attached to the body of the sled for pull of the sled.

15. The system of claim 12, wherein the plurality of compartments open in a substantially upward direction.

16. The system of claim 12, wherein the channel defines a plurality of turns.

17. The system of claim 1, The system of claim 1, wherein the bottom portion defines a slot for fitting to the second end of the cord for removable attachment of the second end of the cord to the bottom portion.

* * * * *